United States Patent
Debuf et al.

(10) Patent No.: US 10,859,454 B2
(45) Date of Patent: Dec. 8, 2020

(54) DELIVERY DEVICE FOR DELIVERING YARNS, METHOD FOR DETERMINING THE TENSION OF YARNS AND USE OF CONTROL MEANS FOR CONTROLLING ACTUATORS FOR DELIVERING YARNS

(71) Applicant: NV MICHEL VAN DE WIELE, Kortrijk/Marke (BE)

(72) Inventors: Geert Debuf, Drongen (BE); Vincent Lampaert, Vichte (BE)

(73) Assignee: NV MICHEL VAN DE WIELE

( * ) Notice: Subject to any disclaimer, the term of this patent is extended or adjusted under 35 U.S.C. 154(b) by 0 days.

(21) Appl. No.: 15/741,550

(22) PCT Filed: Jul. 1, 2016

(86) PCT No.: PCT/IB2016/053960
§ 371 (c)(1),
(2) Date: Jan. 3, 2018

(87) PCT Pub. No.: WO2017/006226
PCT Pub. Date: Jan. 12, 2017

(65) Prior Publication Data
US 2018/0195918 A1 Jul. 12, 2018

(30) Foreign Application Priority Data
Jul. 3, 2015 (BE) .................................. 2015/5424

(51) Int. Cl.
*G01L 5/10* (2020.01)
*D05C 15/18* (2006.01)
(Continued)

(52) U.S. Cl.
CPC .............. *G01L 5/10* (2013.01); *B65H 59/388* (2013.01); *B65H 59/40* (2013.01); *D03D 39/02* (2013.01);
(Continued)

(58) Field of Classification Search
CPC .. G01L 1/00; G01L 5/10; B65H 59/38; B65H 59/388; B65H 59/40; B65H 2701/31;
(Continued)

(56) References Cited

U.S. PATENT DOCUMENTS 2,430,022 A * 11/1947 Lambach ............... D04B 27/00
66/212
3,994,245 A   11/1976 Smith
(Continued)

FOREIGN PATENT DOCUMENTS

| GB | 2046317 A | 11/1980 |
|---|---|---|
| WO | WO 2007/096765 A1 | 8/2007 |
| WO | WO 2012/066416 A1 | 5/2012 |

OTHER PUBLICATIONS

International Search Report and Written Opinion dated Oct. 13, 2016.

*Primary Examiner* — Octavia Hollington
(74) *Attorney, Agent, or Firm* — Fresh IP PLC; Clifford D. Hyra; Aubrey Y. Chen

(57) ABSTRACT

A delivery device with actuators for delivering yarns in a textile machine, controllers for controlling the actuators, which comprise produce measurement signals as a measure of the drive torque of the actuators, and monitors for monitoring the tensions of the yarns using the measurement signals. Additionally, at least one embodiment concerns a method for monitoring the tension of yarns which are delivered in a textile machine by means of actuators, comprising producing measurement signals as a measure of the drive torque of the actuators, which is a measure of yarn tension, and monitoring the tension of the yarns using the measurement signals.

20 Claims, 2 Drawing Sheets

(51) Int. Cl.
*B65H 59/38* (2006.01)
*D03D 47/36* (2006.01)
*B65H 59/40* (2006.01)
*D03D 39/02* (2006.01)
*D03D 49/12* (2006.01)

(52) U.S. Cl.
CPC ............ *D03D 47/36* (2013.01); *D03D 49/12* (2013.01); *D05C 15/18* (2013.01); *B65H 2701/31* (2013.01); *D05D 2205/02* (2013.01); *D05D 2205/18* (2013.01)

(58) Field of Classification Search
CPC ........ D03D 39/02; D03D 47/36; D03D 49/12; D05D 2205/02; D05D 2205/18; D05C 15/18
USPC .......................................................... 73/781
See application file for complete search history.

(56) References Cited

U.S. PATENT DOCUMENTS

| | | | |
|---|---|---|---|
| 4,259,851 A * | 4/1981 | Jacobsson | D04B 15/48 200/61.18 |
| 4,623,101 A * | 11/1986 | Cacak | B65H 59/384 242/413.5 |
| 4,752,044 A * | 6/1988 | Memminger | B65H 59/388 242/365.7 |
| 5,056,042 A | 10/1991 | Lieb | |
| 5,056,442 A | 10/1991 | Nickell et al. | |
| 6,105,398 A * | 8/2000 | Leins | D04B 15/50 66/132 R |
| 6,321,576 B1 * | 11/2001 | Barea | D04B 15/488 66/132 R |
| 7,096,806 B2 * | 8/2006 | Card | D05C 15/18 112/80.73 |
| 7,591,153 B2 * | 9/2009 | Huss | D04B 15/48 66/132 R |
| 8,305,015 B2 * | 11/2012 | Barea | B65H 59/18 318/6 |
| 8,382,023 B2 * | 2/2013 | Barea | D04B 15/48 242/154 |
| 9,527,694 B2 * | 12/2016 | Barea | B65H 59/16 |
| 9,540,209 B2 * | 1/2017 | Barea | B65H 59/388 |
| 9,598,261 B2 * | 3/2017 | Barea | B65H 51/22 |
| 9,828,208 B2 * | 11/2017 | Barea | B65H 51/22 |
| 9,834,403 B2 * | 12/2017 | Barea | B65H 59/385 |
| 2005/0204975 A1 | 9/2005 | Card et al. | |
| 2006/0237567 A1 * | 10/2006 | Castelli | D03D 47/361 242/365.1 |
| 2007/0272784 A1 * | 11/2007 | Huss | D04B 15/48 242/365.6 |
| 2013/0056573 A1 * | 3/2013 | Barea | B65H 51/30 242/420.5 |
| 2013/0228643 A1 * | 9/2013 | Barea | B65H 54/71 242/487.2 |

\* cited by examiner

DELIVERY DEVICE FOR DELIVERING YARNS, METHOD FOR DETERMINING THE TENSION OF YARNS AND USE OF CONTROL MEANS FOR CONTROLLING ACTUATORS FOR DELIVERING YARNS

This application claims the benefit of Belgian patent Application No. 2015/5424, filed Jul. 3, 2015, which is hereby incorporated by reference in its entirety.

FIELD OF THE INVENTION

The present invention relates to a delivery device for delivering several yarns in a textile machine, comprising
several actuators, each for delivering one or more yarns;
control means for controlling the actuators;
and monitoring means for monitoring the tension of the yarns.

In addition, the present invention relates to a method for monitoring the tension of several yarns which are delivered in a textile machine by means of several actuators.

Furthermore, the present invention relates to the use of control means for controlling several actuators for delivering several yarns in a textile machine.

The present invention relates to a delivery device for delivering several yarns in a textile machine, comprising

BACKGROUND

Systems and methods for monitoring the tension of warp or pile yarns which are delivered in a textile machine by means of actuators are known with different kinds of textile machines.

If such yarns are delivered by means of a delivery device and the tension on a yarn increases, such monitoring systems can ensure that the textile machine can be stopped before the yarn breaks.

In carpet weaving machines and tufting machines, typical monitoring systems for the yarn tension are based on contact strips, an example of which is described in U.S. Pat. No. 5,056,442. Yarns are passed over rollers covered with these contact strips. In order to detect variations in the tension of the delivered yarns, these contact strips typically use resistive or capacitive principles. In some cases, optical bars are used.

The combination of the rollers and the contact strips is typically arranged in modules which are composed based on the width of the textile machine.

However, the applied solutions comprising such contact strips have a number of drawbacks.

In order to be able to monitor the tension of the yarns, a monitoring system has to be provided or incorporated in the respective textile machine.

These existing monitoring systems, in each case, monitor a group of yarns which typically cover a zone of 1 metre or more across the width of the textile machine. A variation can then only be localized with an accuracy up to this zone in the textile machine. The specific yarn where the variation occurs cannot be detected.

It is not possible to adjust the monitoring sensitivity separately for different individual yarns within this zone or for different types of yarn within this zone.

GB 2 046 317 A and U.S. Pat. No. 3,994,245 describe monitoring systems in which a detector is assigned to individual yarns in order to thus also be able to determine the location of the yarn having a different tension. By means of the monitoring system from GB 2 046 317 A, it is moreover possible to detect both tensions which are excessively high and excessively low. However, these monitoring systems from GB 2 046 317 A and U.S. Pat. No. 3,994,245 take up a relatively large amount of space per yarn and are thus difficult to implement in textile machines in which large numbers of yarns are to be delivered. With such a system, it is also laborious to adjust the monitoring sensitivity for different individual yarns or different types of yarn.

The tension of the yarns to be monitored has a significant effect on the quality of the carpet. Differences in the tension of the pile yarns with respect to one another during tufting will result in an uneven pile height of the tufted carpet. When weaving carpets, the tension of the delivered warp yarns is also crucial to produce a carpet of good quality.

In a tuft machine, up to 500 pile yarns are delivered per metre of machine width, in a (face-to-face) weaving machine this varies between 200 to 6000 pile warp yarns and approximately 150 to 300 ground warp yarns. Due to these large numbers and the relatively slow speed of these yarns (a few metres per minute), there is a need for a simple, compact, robust and inexpensive solution which can readily be implemented, but which nevertheless offers the option of individual yarn monitoring.

SUMMARY

It is an object of the present invention to provide a system and a method for monitoring the tension of yarns, by means of which the monitoring may also be effected in a more focussed manner for relatively large numbers of yarns to be delivered, both with regard to localization and types of yarn.

This object of the present invention is achieved by providing a delivery device for delivering several yarns in a textile machine, comprising
several actuators, each for delivering one or more yarns;
control means for controlling the actuators;
and monitoring means for monitoring the tension of the yarns;
wherein the control means comprise measuring means for producing measurement signals for each actuator which are a measure of the drive torque of said actuator, and wherein the monitoring means are configured to monitor the tension of the yarns using said measurement signals.

The drive torque of each actuator is a good measure of the tension in the one or more yarns to be delivered thereby. This drive torque can easily be determined in known ways by measuring one or more parameters of the actuator, e.g. in the case of electrical actuators the current in and/or the voltage across the actuator, together with the calculation from the actuator model using these measurements, optionally by means of additional supplementary sensors which measure the position and/or the speed of the actuator.

The means which may be used to determine said drive torque are for the most part already present with existing textile machines, in which case the existing means can readily be adapted or only a limited number of additional monitoring means have to be provided to monitor the tension of the one or more yarns.

In this case, it is readily possible to monitor the yarns to be monitored in a more targeted manner or even individually. It is then also readily possible to adapt monitoring to the types of yarn which are to be delivered.

It is possible to determine such a drive torque for each actuator, so that, depending on the number of yarns delivered by such an actuator, this drive torque can be used to monitor one single yarn or several yarns. By monitoring the drive torques of several actuators separately, the tension in the yarns delivered by these actuators is also monitored separately, which makes it possible to localize problems easily. Where different actuators deliver different types of yarn, it is also possible to adjust the monitoring of the tension in these yarns to the type of yarn in a simple manner.

In a particularly compact embodiment of a delivery device according to the present invention, the monitoring means are incorporated in the control means.

Preferably, a delivery device comprises an abovementioned actuator for each yarn to be delivered, so that monitoring of each single yarn is also possible, thus making very accurate localisation of problems possible and also making it easy to adjust the monitoring sensitivity to each type of yarn to be delivered.

The actuators from a delivery device according to the present invention are preferably arranged in a virtually vertical plane, horizontally and vertically next to each other.

Furthermore preferably, a delivery device according to the present invention comprises indication means for producing an indication for each actuator with regard to the monitored yarn tension.

Furthermore preferably, the delivery device comprises several actuators and these actuators are compact and light. By means of such actuators, it is possible to realize a delivery device in a limited space which can deliver several yarns individually. Preferably, the actuators are incorporated in a vertical plane vertically and horizontally next to each other in a supporting structure, so that it is possible to deliver tens, hundreds up to thousands of yarns per metre of machine width in a limited space.

The object of the invention is also achieved by providing a textile machine comprising a delivery device for delivering several yarns, comprising an above-described deliver device according to the present invention.

More specifically, such a textile machine may be a tufting machine or a weaving machine, which may be, more specifically, an Axminster weaving machine.

The object of the present invention is furthermore also achieved by providing a method for monitoring the tension of several yarns which are delivered by means of several actuators in a textile machine, comprising producing measurement signals for each actuator, as a measure of the drive torque of said actuator, which is related to the yarn tension and the monitoring of the tension of the yarns using these measurement signals.

A specific method according to the present invention may comprise one or more of the following steps for one or more determined drive torques:

comparing the determined drive torque to an upper value and producing an indication if the determined drive torque exceeds said upper value;

comparing the determined drive torque to an upper value and producing an indication if the determined drive torque exceeds said upper value for a certain period of time;

comparing the determined drive torque to a lower value and producing an indication if the determined drive torque drops below this lower value;

comparing the determined drive torque to a lower value and producing an indication if the determined drive torque remains below said lower value for a certain period of time;

comparing the change in successive determined values of the drive torque to a reference value and producing an indication if the change exceeds this reference value;

determining the difference between the determined drive torque of a first actuator and the determined drive torque of a second actuator, comparing said difference to a limit value and producing an indication if said difference exceeds said limit value.

The expression one or more determined drive torques is here understood to mean any value which can be used as a measure of this drive torque. The abovementioned comparisons may be based on the drive torque itself or based on any value which is a measure of this drive torque. Since this drive torque itself is a measure of the yarn tension, this comparison may also be based on a yarn tension which is determined further therefrom. If the torque is determined, for example, from a current value or a tension value, then this comparison may also be carried out on the basis of this current value or this tension value.

For these one or more determined drive torques, instantaneous values may be used, or average values which have been averaged across a certain time interval.

Such a specific method may furthermore comprise initially determining the drive torque of each actuator in order to determine one or more upper values and/or one or more lower values for this drive torque and/or one or more reference values for the change in this drive torque and/or one or more limit values for the difference between two determined drive torques. In this way, it becomes readily possible to calibrate a monitoring system when changing yarns.

With such a specific method, it is additionally or alternatively possible to determine one or more upper values and/or the one or more lower values and/or the one or more reference values and/or the one or more limit values as a function of the nominal torque of each actuator.

For with various applications, it is preferred not to use a fixed value for this upper value and/or lower value and/or reference value and/or limit value, but a value which varies over time, depending on the desired delivery of yarns.

Preferably, this upper value and/or lower value and/or reference value and/or limit value can be set by a user.

When delivering different yarns and/or different types of yarn, in such a specific method the user may furthermore preferably by means of an optionally graphic representation on a user interface of the textile machine visually check and/or adjust the lower value and/or upper value and/or reference value to various individual yarns and/or to various types of yarn in a simple manner. If various monitoring zones are provided across the width of a textile machine, the user may in addition, preferably by means of a (graphic) representation at machine level, check the various monitoring zones across the width of the textile machine as well as the difference between the front and rear side of the machine at a glance.

An abovementioned indication preferably also comprises an indication of the location where the problem has occurred. Various methods may be used to produce such an indication. A signal may be produced on a user interface and/or visual indication means may be incorporated in the drive device, such as for example at the location of the actuators or at another location in the machine. LEDs may for example be used as visual indication means. A numerical value or another code for identifying the location of the problem may be given as signal on the user interface. The location may also be displayed by means of a graphic representation of the textile machine.

With a textile machine in which several yarns are delivered across the width of the textile machine, the course of the yarn tension across the width of the textile machine may be displayed visually on a user interface for observation purposes, in order to quickly and easily detect specific variations (compared to the yarn tension of adjacent yarns) and/or problems at certain locations before the textile machine has to come to a stop. In this way, it is possible to detect problems, for example in connection with the guidance of certain individual yarns or yarn groups, in a preventative way before the yarns reach the actuators (i.e. before the machine has to be stopped or a yarn has broken).

In a particularly preferred method according to the present invention, the drive torque which corresponds to each actuator is determined and the determined drive torque is checked against a corresponding abovementioned upper value and/or a corresponding abovementioned lower value and/or a corresponding abovementioned reference value and/or the difference between said determined drive torque and a second determined drive torque of another actuator is checked against a corresponding abovementioned limit value and each generated indication comprises an indication of the respective actuator.

If only one actuator is used for each yarn, this immediately also gives an indication of the yarn where the problem has occurred.

In a further preferred method according to the invention, one or more abovementioned upper values and/or one or more abovementioned lower values and/or one or more abovementioned reference values and/or one or more abovementioned limit values are set by a user.

In addition, the object of the present invention is also achieved by providing a use of control means for controlling actuators for delivering yarns in a textile machine and which comprise measuring means for producing measurement signals for each actuator which are a measure of the drive torque of said actuators in order to monitor the tension of the yarns.

With existing textile machines which already comprise control means for controlling actuators, use is now made, according to the present invention, of the means which are already present to monitor the tension of the yarns, without these textile machines having to be greatly expanded mechanically and/or having to be provided with additional monitoring means.

BRIEF DESCRIPTION OF THE DRAWINGS

The present invention will now be explained by means of the following detailed description of an embodiment of a delivery device, a method and a use according to the present invention. The sole aim of this description is to provide illustrative examples and to indicate further advantages and particulars of the present invention, and can thus not be interpreted as limiting the area of application of the invention or of the patent rights defined in the claims.

Reference numerals are used in this detailed description to refer to the attached drawings, in which.

DETAILED DESCRIPTION

Figure 1:
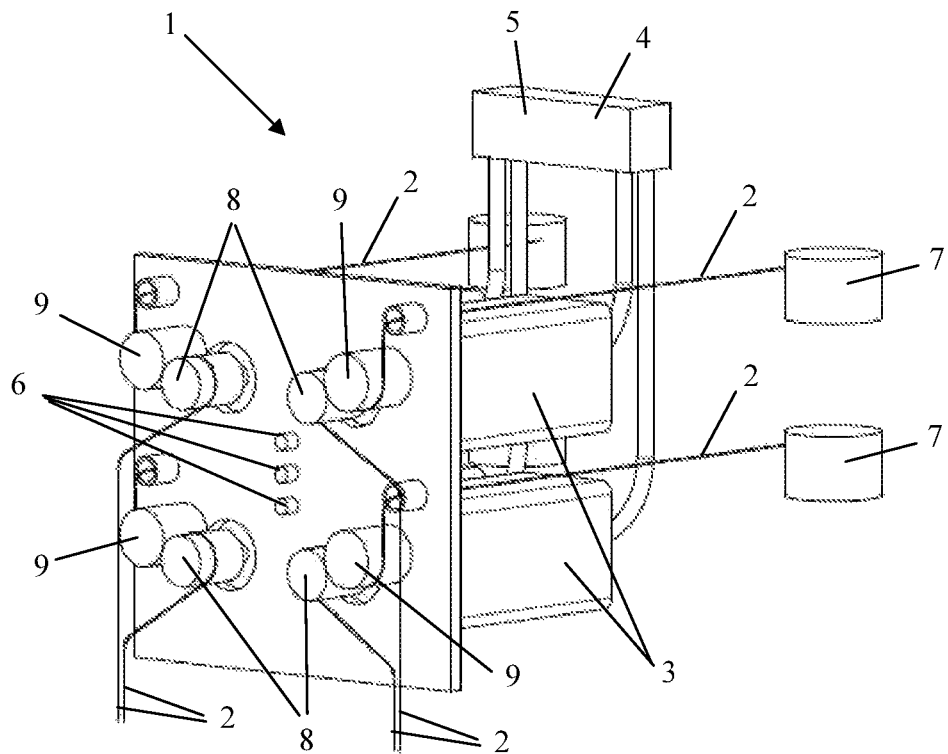
FIG. 1 shows a yarn-delivering module from a tufting machine according to the present invention in perspective, with four actuators for delivering four yarns.

FIG. 1 diagrammatically shows a yarn-delivering module (1) from a tufting machine in perspective in order thereby to illustrate simply the principle of monitoring the tension of yarns according to the present invention. It is obvious that, on the basis hereof, a person skilled in the art can easily develop monitoring systems for other types of textile machines using the same principle.

A tufting machine typically comprises a plurality of the illustrated yarn-delivering modules (1) for delivering pile yarns (2).

The illustrated yarn-delivering module (1) comprises four motors (3) for driving drive rolls (8). By means of these drive rolls (8), yarns (2) are unrolled from bobbins (7) and delivered in the tufting machine. These yarns (2) are guided by guide rollers (9) at the location of the drive rolls (8). In such a tufting machine, different types of motors (3) may serve as actuators (3), preferably rotating motors, such as DC motors, brushless DC motors, brushless AC motors, etc.

The yarn-delivering module (1) furthermore comprises control means (4) for controlling the motors (3). According to the present invention, these control means (4) are now also used as monitoring means (5) for monitoring the tension of the yarns (2) to be delivered. These monitoring means (5) are therefore also incorporated in these control means.

The tension of these yarns (2) can be calculated from the drive torque of the motors (3). The abovementioned types of motor allow, for example, to determine this drive torque using the motor model and current and/or voltage measurements, etc. and if motor synchronization feedback is present, the determination of the position and/or the speed.

Figure 2:
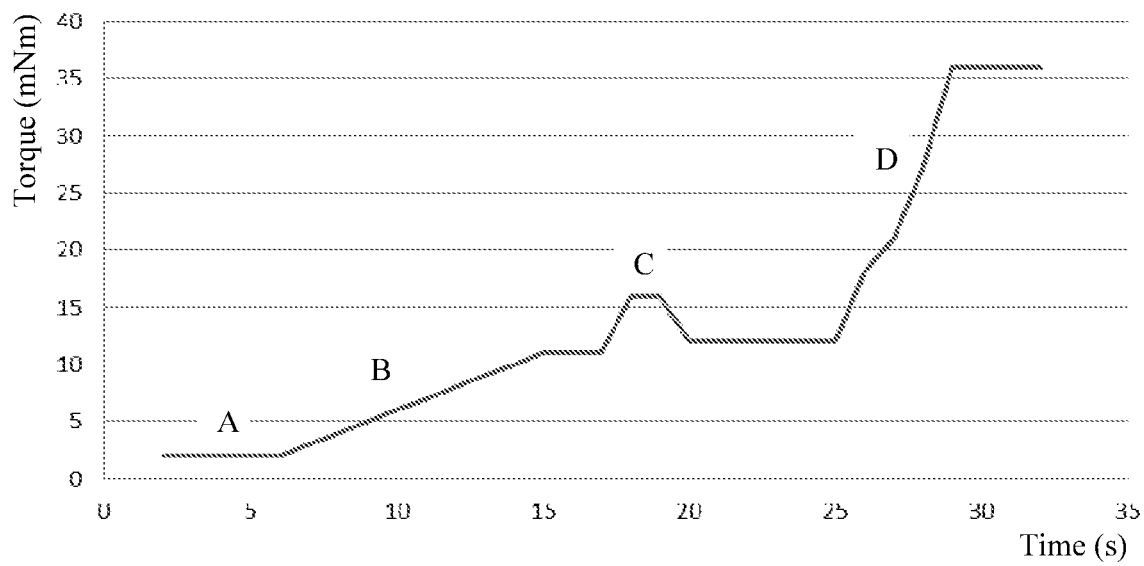
FIG. 2 shows a graph of the drive torque of an actuator from a yarn-delivering module from FIG. 1 as a function of time.

FIG. 2 shows a graph of such a motor torque (in mNm) as a function of time (s). In a first phase (A), the static torque due to the dry friction is shown. In a second phase (B), the torque at a speed-dependent dynamic friction is shown. In a third phase (C), a varying torque due to a change in speed is shown. Finally, in a fourth phase (D) an increase in the motor torque as a result of an excessively taut yarn (2) is shown.

The different phases shown by the course of the motor torque in FIG. 2, illustrate the various possible yarn tension phases of a delivered yarn. During the first phase (A), no yarn is yet being delivered, the static torque still has to be overcome. The second phase (B) and the third phase (C) show the normally expected operating range of the motor torque, consequently of the actuator and of the yarn tension. Yarn is being delivered, a changing torque due to an increase in speed in the delivery of the yarn indicates a quicker consumption, a changing torque as a result of a decrease in speed indicates a slower consumption. During the fourth phase (D), the motor torque increases greatly due to an excessively taut yarn. This situation is undesirable and should be avoided as much as possible.

The tension of the yarns (2) can be calculated on the basis of the determined drive torque of the motors (3), the diameter of the drive rolls (8) and various correction factors. These correction factors depend on the specific drive device and yarn-delivering values. The drive device determines the friction-dependent torsion components. A further torsion component depends on the motor speed which is required for the desired delivery rate of the yarn (2). This speed may also change over time.

The tension of the yarns (2) can thus be calculated by the monitoring means (5) of the yarn-delivering module (1). This calculated yarn tension can be compared to monitoring values for monitoring this tension.

Figure 4:
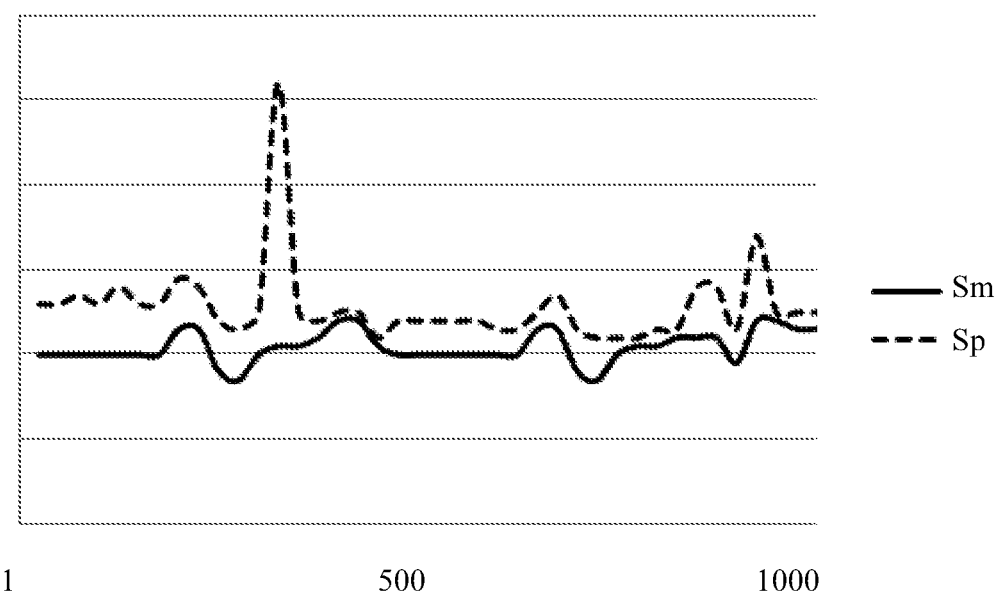
FIG. 4 shows a conceptual representation of a graph of the instantaneous yarn tension and the average yarn tension across the width of the tufting machine with respect to the needle number.

It is possible to calculate instantaneous values (Sp) and average values (Sm) for this yarn tension. FIG. 4 shows a graph in which such instantaneous yarn tensions (Sp) and such average yarn tensions (Sm) across the width of the tufting machine are represented. Such a graph may be displayed, for example, on a user interface. These values can be used to monitor this tension. When the values become excessively high and/or excessively low, the tufting machine can be stopped. The user interface may also show limit values (lower value/upper value) for each yarn (2) in this graph in order to facilitate the interpretation thereof.

The yarn tensions across the width of the tufting machine are typically shown relative to the needle number and not relative to a unit of length. In this way, the user learns more quickly where the excessively high and/or excessively low values occur. The tufting machine in this example has 1000 needles.

An excessively taut yarn (2) is detected when the tension exceeds a determined upper value. If this upper value is exceeded for a certain period of time, an indication may be produced and suitable actions may be taken, such as stopping the tufting machine and indicating the location of the problem.

This situation is illustrated in phase 4 in FIG. 2. By stopping the tufting machine, the motor torque no longer increases and therefore neither does the yarn tension, yarn breakage can be prevented and the problem can be solved.

When a yarn (2) breaks, a tension which is lower than a determined lower value or a sudden drop in the tension may be observed and the required actions may be taken. The monitoring of a lower value may start immediately, or after a certain period of time.

It is furthermore also possible to produce a tension profile for each individual yarn (2). This tension profile may, for example, be adapted to the type of yarn or to the desired pile height.

If the tension for example exceeds a predefined slope, the machine may be stopped. With a graph such as the graph from FIG. 4, the user can easily detect whether there is a difference in tension between e.g. different yarns (2) of the same type across the width of the machine. After all, a difference in tension may be indicative of irregularities, such as a less good guidance during the delivery of some yarns (2). As a result thereof, it is possible to identify inaccuracies in the delivery of the yarns (2) more easily. This detection could also be implemented by means of software, in which case an indication is given if the difference in tension exceeds a determined limit value.

Typically, the bobbins (7), on which the yarn supply is kept, are grouped in a creel, sometimes at a large distance from the tufting machine. Guide tubes in which the yarns are delivered, run between the creel and the actuators.

The difference in tension between the yarns is a measure of the quality of the creel and of the delivery through the guide tubes to the actuators. This quality is connected to the quality of the end product. After all, a uniform yarn tension across the entire machine width is desirable, as differences in tension between the yarns (2) are noticeable in the end product (the tufted carpet). Any corrections with regard to the difference in tension thus have a positive effect on the quality of the end product. When delivering yarns (2) to different zones, tension variations are known and expected to occur occasionally, inter alia due to guide tubes of different lengths or guide tubes which have more and/or sharper corners in their delivery path.

If, in addition, the information about such determined differences in tension can be combined with the information about the threading of the needles (which needle has which yarn type), the delivery path of the guide tubes and the arrangement of the creel, it is possible to determine the following by means of simple algorithms:

Which tube bundle causes a significantly greater yarn tension than the others?

What is the yarn tension across the machine width, determined for each yarn type? Is the tension of the yarns of the same yarn type more or less uniform across the entire machine width?

What is the yarn tension across a portion of the machine width, across a certain "problem zone"?

Answers to these questions may result in modifications in the creel and/or the guide tubes, as a result of which the differences in tension between the different yarns across the machine width are greatly reduced and an end product of higher quality is obtained as a result.

The monitoring means (5) may provide an indication in the case of an abovementioned problem. The illustrated yarn-delivering module (1) is provided with three LEDs (6) for visualizing this indication. By means of a corresponding code, it is possible to indicate in which motor (3) this problem was detected and thus with which yarn (2) the problem occurs.

In addition, the user interface of the textile machine may also give an indication of the location of the motor where the problem was detected and of the type of problem. This indication may be a number code which e.g. displays a numerical value or another code or a graphic indication of the location on the textile machine, for example by means of a graph as is illustrated in FIG. 4, optionally supplemented with limit values (upper value/lower value) for each yarn.

The limit values (upper value/lower value) may preferably also be adjusted by means of the user interface. In order to determine these limit values, it is important to take the thickness of the respective yarn into account.

This setting may also be visualized, so that the user can check the limit values at a glance. This visualization may then be combined in a simple manner with a tension graph, such as e.g. the graph from FIG. 4. In this way, the set tension profiles and the actual tension are then shown, viewed across the width of the machine.

Figure 3:
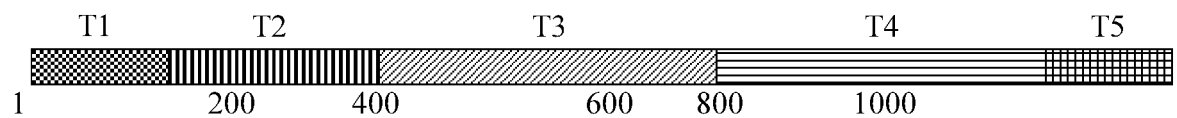
FIG. 3 shows a visual representation of the set tension levels and the set tension zones, viewed across the width of the tufting machine, with respect to the needle number.

FIG. 3 shows a possible visual representation of the set tension levels (T1, T2, T3, T4, T5) and the set tension zones, viewed across the width of the machine, which can be used for this purpose. The width of the set zones may in this case be set, for example, at up to 1 yarn. In this way, the user can adjust and/or check the various settings for the different types of yarn in a simple way. If there is a pattern in the delivery of the different types of yarn, then this pattern will be clearly noticeable on the visual representation.

On the visual representation from FIG. 3, the different tension levels are set each time for one particular zone in the machine width. The tension levels are here also shown relative to the needle number. Obviously, one tension level may be set in several zones of the machine. The number of set tension levels does not have to be limited to five. A tension level may, for example, correspond to a special effect which is intended in the tufted carpet or to a different type of yarn.

Here, the tension level (T1, T2, T3, T4, T5) is represented visually by means of different shadings, but could also be indicated by means of, for example, different colours. If a difference is made between the front side and the rear side of the tufting machine, two such representations may be shown one above the other on the user interface.

In order to check the tension in the yarn in a simple manner, the set tension level across the entire machine width may also be depicted in a graph which strongly resembles the graph in FIG. 4. Through simple comparison of this graph with the graph from FIG. 4, it is possible to see at a glance whether the tension of one or more delivered yarns has almost reached a critical value or not.

The invention claimed is:

1. Delivery device for delivering several yarns in a textile machine and across a width of the textile machine, comprising:
   several actuators, each for delivering one or more yarns, such that each of the one or more yarns is delivered using only one of the several actuators;
   controllers for controlling the actuators;
   monitors for monitoring tensions of the yarns;
   wherein the controllers are configured to produce measurement signals for each actuator which are a measure of drive torque of each actuator, wherein the tensions of the yarns can be calculated from the drive torque of each actuator, and wherein the monitors are configured to monitor the tensions of the yarns using said measurement signals,
   wherein the several actuators are electrical actuators,
   wherein the measurement signals are generated based on measured current in each of the several actuators and/or measured voltage across each of the several actuators, and
   wherein the monitoring comprises, for at least one determined drive torque, comparing the determined drive torque to an upper value and producing an indication if the determined drive torque exceeds said upper value, comparing the determined drive torque to a lower value and producing an indication if the determined drive torque drops below said lower value; comparing a change in successive determined values of the drive torque to a reference value and producing an indication if the change exceeds this reference value.

2. Delivery device according to claim 1, characterized in that the monitors are incorporated in the controllers.

3. Delivery device according to claim 1, characterized in that the several actuators each delivers only one yarn.

4. Delivery device according to claim 1, characterized in that the actuators are arranged in a virtually vertical plane, horizontally and vertically next to each other.

5. Delivery device according to claim 1, characterized in that said delivery device is configured to produce an indication for each actuator and each monitored yarn tension.

6. Textile machine comprising a delivery device for delivering several yarns, characterized in that the delivery device is the delivery device according to claim 1.

7. The delivery device of claim 1, wherein the one or more yarns is selected from the group consisting of warp yarns, pile yarns, and combinations thereof.

8. Method for monitoring tensions of several yarns which are delivered in a textile machine by means of several actuators, characterized in that said method comprises delivering each of the several yarns using only one of the several actuators, producing measurement signals for each actuator as a measure of drive torque of said actuator, wherein the yarn tension can be calculated from the drive torque, and monitoring the tensions of the yarns using said measurement signals, wherein the several actuators are electrical actuators, and wherein the measurement signals are generated based on measured current in each of the several actuators and/or measured voltage across each of the several actuators, wherein monitoring comprises, for at least one determined drive torque, comparing the determined drive torque to an upper value and producing an indication if the determined drive torque exceeds said upper value; comparing the determined drive torque to a lower value and producing an indication if the determined drive torque drops below said lower value; comparing a change in successive determined values of the drive torque to a reference value; and producing an indication if the change exceeds this reference value.

9. Method according to claim 8, characterized in that the method comprises, for at least one determined drive torque, comparing the determined drive torque to an upper value and producing an indication if the determined drive torque exceeds said upper value for a certain period of time.

10. Method according to Claim 8, characterized in that the one or more upper values are determined as a function of the nominal drive torque of each actuator.

11. Method according to Claim 8, characterized in that the method, for at least one determined drive torque, comprises comparing the determined drive torque to a lower value and producing an indication if the determined drive torque remains below said lower value for a certain period of time.

12. Method according to Claim 8, characterized in that the lower value is determined as a function of nominal drive torque of each actuator.

13. Method according to Claim 8 characterized in that the reference value is determined as a function of nominal drive torque of each actuator.

14. Method according to claim 8, characterized in that the method, for at least two of the determined drive torques, comprises determining a difference between said at least two of the determined drive torques, comparing said difference to a limit value, and producing an indication if said difference exceeds said limit value.

15. Method according to claim 14, characterized in that the limit value is determined as a function of nominal drive torque of each actuator.

16. Method according to Claim 8, characterized in that said method comprises initially determining the drive torque of each actuator to determine a first set of values, said first set comprising:
   one or more upper values;
   one or more lower values for said drive torque;
   one or more reference values for a change in said drive torque; and
   one or more limit values for a difference between two determined drive torques.

17. Method according to claim 16, characterized in that the first set of values is determined as a function of nominal drive torque of each actuator.

18. Method according to Claim 8, characterized in that the drive torque which corresponds to each actuator is determined, in that said drive torque is checked against a second set of values and in that each generated indication comprises an indication of the respective actuator, said second set of values comprising:
   an upper value;
   a lower value;
   a reference value for a change in said drive torque; and
   a limit value for a difference between said drive torque and a second determined drive torque of another actuator.

19. Method according to Claim 8, characterized in that a third set of values are set by a user, said third set comprising:
   one or more upper values;
   one or more lower values;

one or more referenced values for a change in said drive torque; and one or more limit values for a difference between two determined drive torques.

20. A method, comprising:

using controllers to control actuators for delivering several yarns in a textile machine, wherein each of the several yarns is delivered using only one of the actuators, wherein the controllers are configured to produce measurement signals for each actuator which are a measure of drive torque of said actuators wherein tensions of the yarns can be calculated from the drive torque, wherein the actuators are electrical actuators, and wherein the measurement signals are generated based on measured current in each actuator and/or measured voltage across each actuator; and monitoring the tensions of the yarns using the measurement signals, wherein monitoring comprises, for at least one determined drive torque, comparing the determined drive torque to an upper value and producing an indication if the determined drive torque exceeds said upper value; comparing the determined drive torque to a lower value and producing an indication if the determined drive torque drops below said lower value; comparing a change in successive determined values of the drive torque to a reference value and producing an indication if the change exceeds this reference value.

* * * * *